(12) United States Patent
Li (10) Patent No.: US 11,326,635 B2
(45) Date of Patent: May 10, 2022

(54) SECURING DEVICE OF BICYCLE HANDLEBAR STEM

(71) Applicant: Mu-Rong Li, Taichung (TW)

(72) Inventor: Mu-Rong Li, Taichung (TW)

(73) Assignee: GREAT GO CYCLES INC., Taichung (TW)

( * ) Notice: Subject to any disclaimer, the term of this patent is extended or adjusted under 35 U.S.C. 154(b) by 307 days.

(21) Appl. No.: 16/556,237

(22) Filed: Aug. 30, 2019

(65) Prior Publication Data

US 2021/0062841 A1 Mar. 4, 2021

(51) Int. Cl.
*F16B 7/04* (2006.01)
*B62K 21/12* (2006.01)
*F16B 2/06* (2006.01)

(52) U.S. Cl.
CPC ............ *F16B 7/0486* (2013.01); *B62K 21/12* (2013.01); *F16B 2/065* (2013.01)

(58) Field of Classification Search
CPC ... F16B 7/0486; F16B 2037/007; B62K 21/12
USPC ........................................................ 411/388
See application file for complete search history.

(56) References Cited

U.S. PATENT DOCUMENTS

| 3,385,615 | A | * | 5/1968 | Hussey | ...................... | F16B 2/08 |
| | | | | | | 403/235 |
| 6,058,800 | A | * | 5/2000 | Giard | ...................... | B62K 21/12 |
| | | | | | | 280/279 |
| D753,025 | S | * | 4/2016 | Chen | ...................... | B62K 21/16 |
| | | | | | | D12/118 |
| D920,174 | S | * | 5/2021 | Lin | .............................. | D12/118 |
| 2014/0373670 | A1 | * | 12/2014 | Huang | ................... | B62K 21/12 |
| | | | | | | 74/551.1 |
| 2015/0225035 | A1 | * | 8/2015 | Li | .......................... | B62K 19/40 |
| | | | | | | 74/551.8 |
| 2019/0367121 | A1 | * | 12/2019 | Vandermolen | ........ | B60T 11/046 |
| 2019/0367122 | A1 | * | 12/2019 | Vandermolen | ......... | B62K 19/38 |

\* cited by examiner

*Primary Examiner* — Joshua T Kennedy (57) ABSTRACT

A bicycle handlebar stem includes a body having a connection portion and a top clamp respectively formed on two ends thereof. The body includes a space defined therein, and an opening communicates with the space and outside of the body. A bottom member has a tongue extending inserted into the opening and the space. A bottom clamp is formed to the bottom member and includes an upward portion extending upwardly and toward the downward portion of the top clamp. A passage is defined between the top clamp, the bottom clamp and the body so as to receive a handlebar. A connection member extends through the body and the tongue to connect the bottom member to the body. Two fasteners extend through the underside of the bottom clamp and are connected to the top clamp.

4 Claims, 8 Drawing Sheets

SECURING DEVICE OF BICYCLE HANDLEBAR STEM

BACKGROUND OF THE INVENTION

1. Fields of the Invention

The present invention relates to a bicycle handlebar stem, and more particularly, to a securing device for securely connect a handlebar to the bicycle handlebar stem.

2. Descriptions of Related Art

The conventional bicycle handlebar stem has one end thereof connected to the steering tube, and the other end of the handlebar stem is connected to the handlebar. The users hold the handlebar to control the direction of the front wheel of the bicycle and also fight against vibration transmitted from the roads. The conventional securing device of the handlebar stem uses two bolts which usually connect the handlebar stem to the handlebar in the direction that is same as the bicycle moves. Therefore, the force that applied to the bolts when the bicycle is operated on a rugged roads may loosen the bolts such that the handlebar cannot be well secured to the handlebar stem. Besides, the bolt heads are exposed beyond the handlebar stem and affect outer appearance of the handlebar stem. Wind resistance may also be increased due to the exposed bolt heads.

The present invention intends to provide a bicycle handlebar stem to eliminate the problems mentioned above.

SUMMARY OF THE INVENTION

The present invention relates to a bicycle handlebar stem and comprises a body having a connection portion formed on the first end thereof, and a top clamp is formed on the second end of the body. The top clamp has a downward portion extending downwardly. The body has a space defined therein, and an opening communicates with the space and outside of the body. A bottom member is connected to the body and includes a tongue extending from the first end thereof. A bottom clamp is formed on the second end of the bottom member. The bottom clamp has an upward portion extending upwardly and toward the downward portion of the top clamp. The opening is located corresponding to the downward portion of the top clamp and the upward portion of the bottom clamp. The tongue is inserted into the space via the opening. A passage is defined between the top clamp, the bottom clamp and the body so as to receive a handlebar. A connection member extends through the body and the tongue of the bottom member to connect the bottom member to the body. At least one fastener extends through the underside of the bottom clamp and is connected to the top clamp.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 5, the bicycle handlebar stem of the present invention is connected between the steering tube 8 and the handlebar 7, and comprises a body 1 and a bottom member 2. The body 1 comprises a connection portion 11 formed on the first end thereof, and a top clamp 15 formed on the second end of the body 1. The top clamp 15 has a downward portion extending downwardly. The downward portion of the top clamp 15 includes a first face 151 that faces downward. The top clamp 15 includes a reception member 152 embedded therein. The reception member 152 includes two reception portions 1521 and a bridge 1523 which is formed between the two reception portions 1521. Each of the two reception portions 1521 includes an inner threaded hole 1522 that opens through the first face 151 of the top clamp 15. The body 1 further has a space 16 defined therein, and an opening 17 communicates with the space 16 and outside of the body 1. Specifically, the body 1 includes a top part 12, a bottom part 13 and two lateral parts 14. The space 16 is defined between the top part 12, the bottom part 13 and the two lateral parts 14. The connection portion 11 extend from respective first ends of the top part 12, the bottom part 13 and the two lateral parts 14. The top clamp 15 extends from the second end of the top part 12. The connection portion 11 is used to secure to the steering tube 8 so as to control the front wheel of the bicycle (not shown).

The bottom member 2 includes a tongue 21 extending from the first end thereof, and a bottom clamp 22 is formed on the second end of the bottom member 2. The bottom clamp 22 has an upward portion extending upwardly and toward the downward portion of the top clamp 15. The upward portion of the bottom clamp 22 includes a second face 223 that faces the first face 151. The opening 17 is located corresponding to the downward portion of the top clamp 15 and the upward portion of the bottom clamp 22. The tongue 21 is inserted into the space 16 via the opening 17. A passage 3 is defined between the top clamp 15, the bottom clamp 22 and the body 1 so as to receive the handlebar 7. Preferably, the bottom clamp 22 includes two curved faces 221 formed on the top face that faces the passage 3. A recess 222 is formed between the two curved faces 221. The two curved faces 221 contact the handlebar 7.

Figure 1:
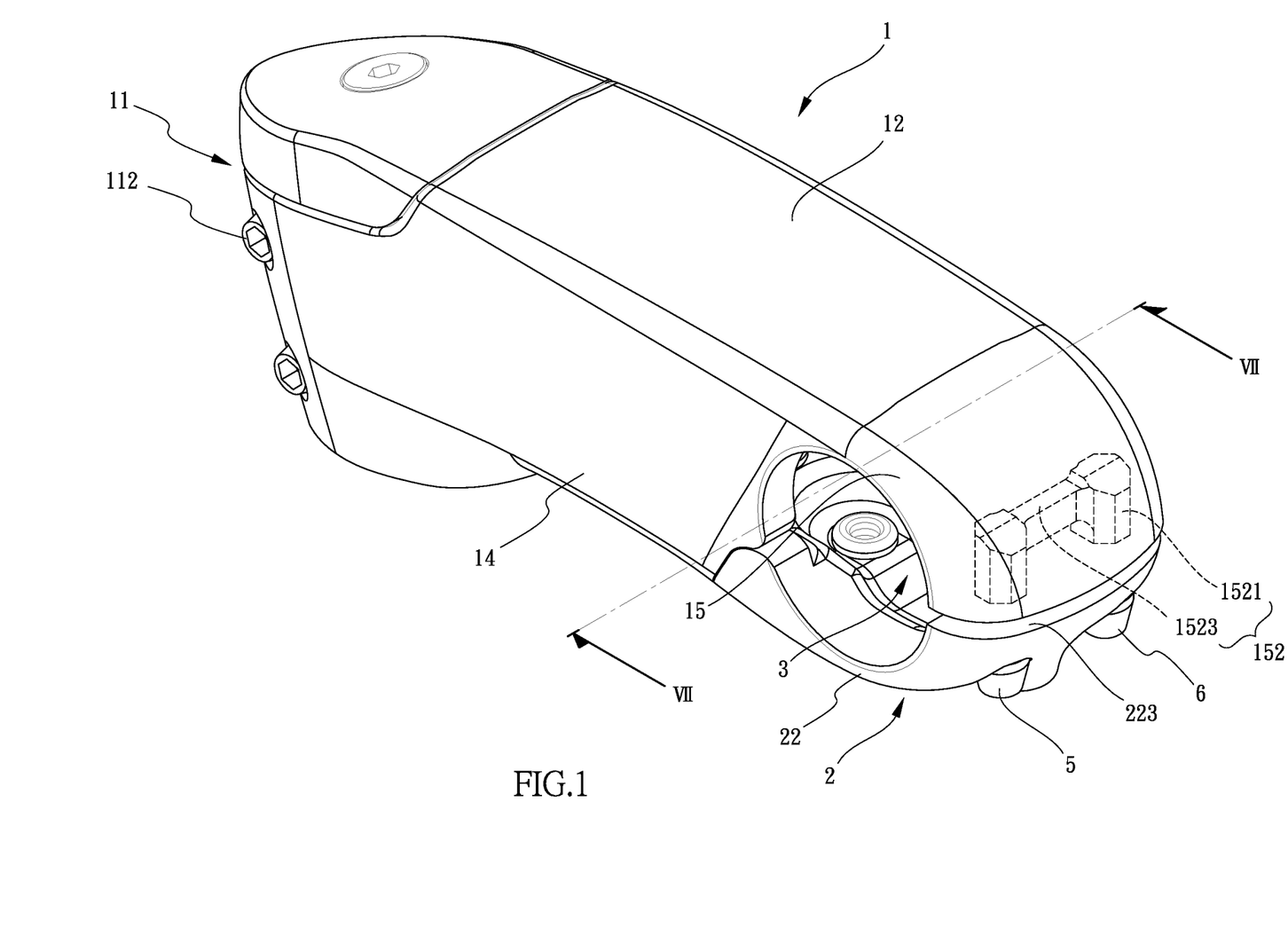
FIG. 1 is a perspective view to show the handlebar stem of the present invention.
Figure 2:
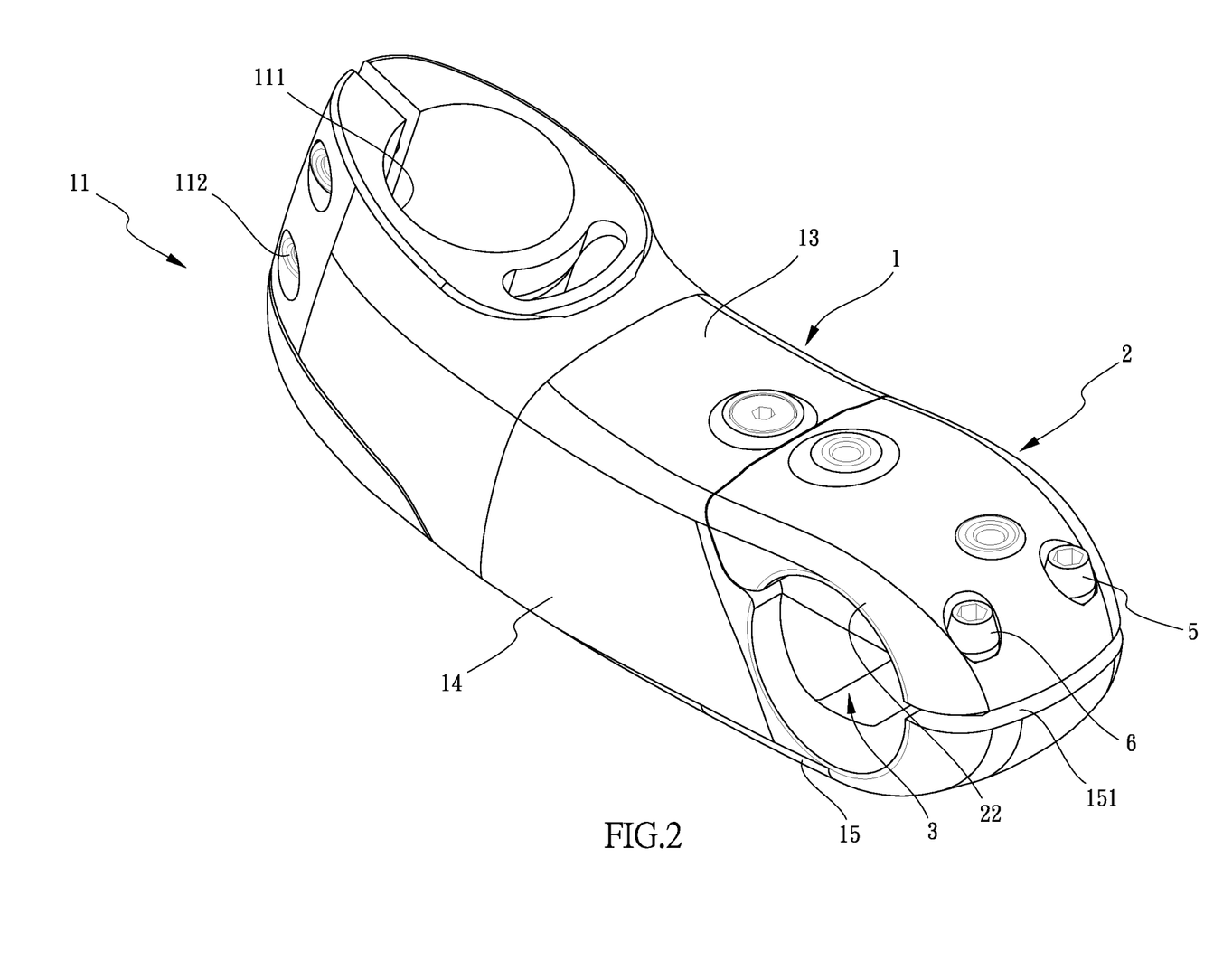
FIG. 2 is another perspective view to show the handlebar stem of the present invention.
Figure 3:
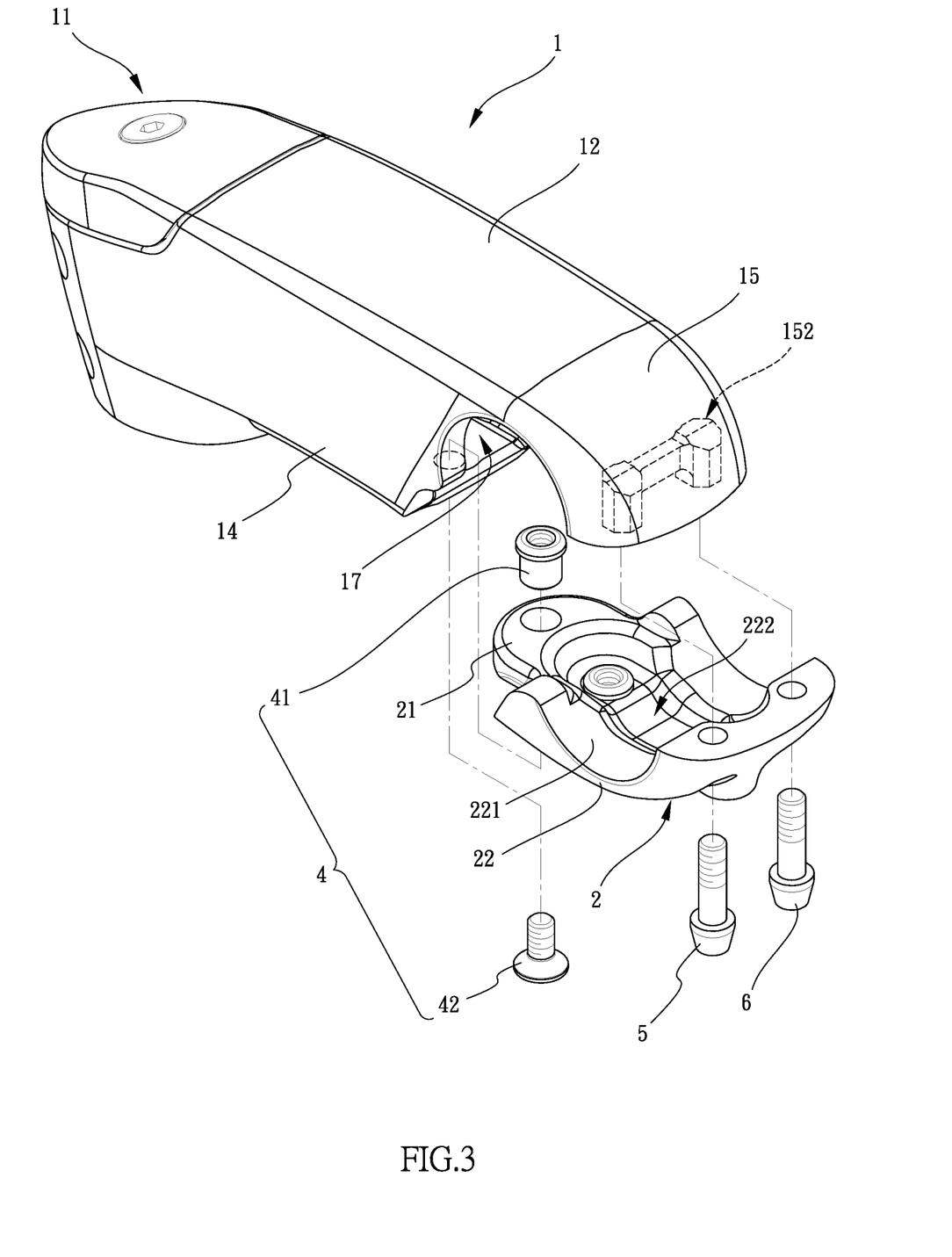
FIG. 3 is an exploded view of the handlebar stem of the present invention.
Figure 4:
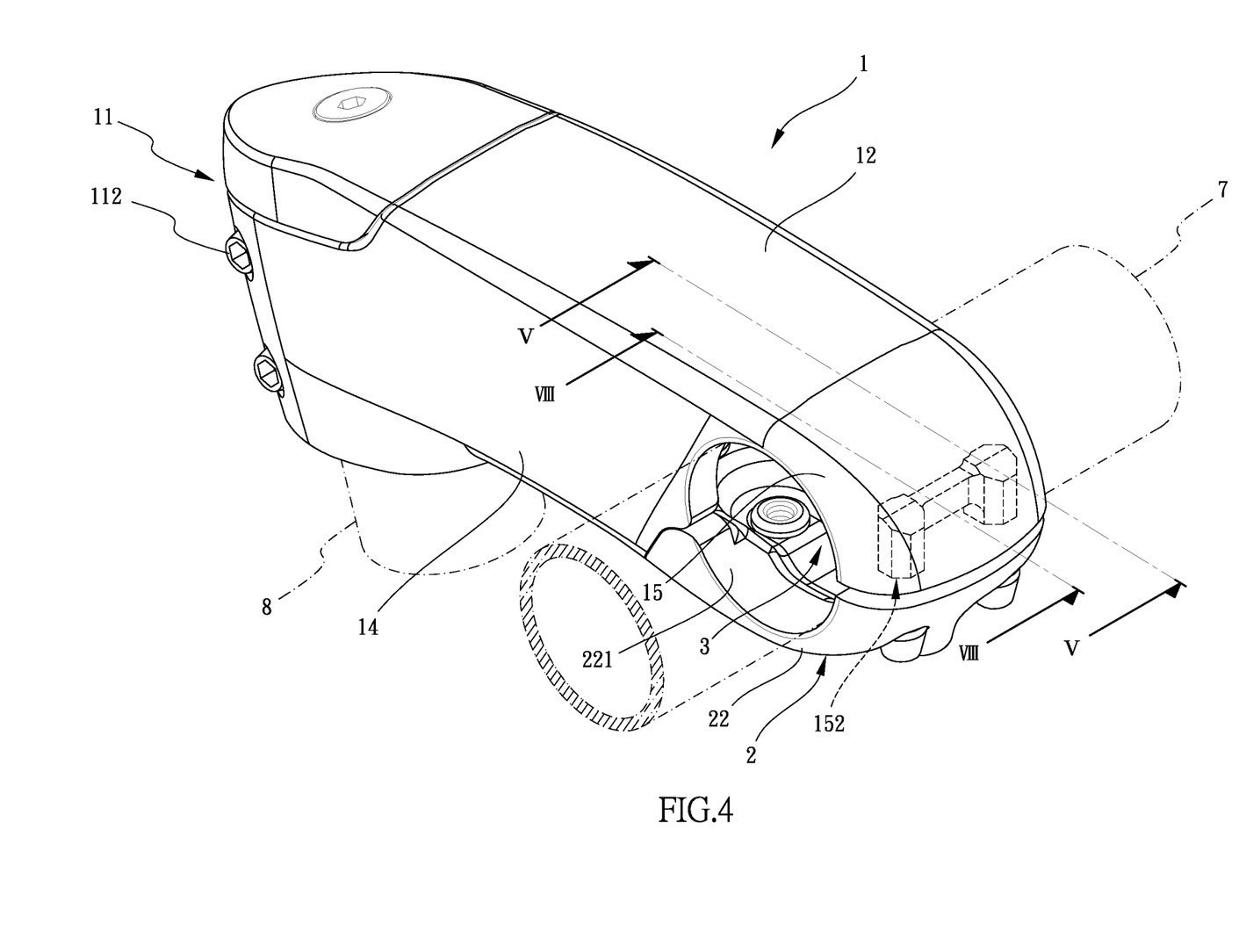
FIG. 4 shows that a handlebar is connected to the handlebar stem of the present invention.
Figure 5:
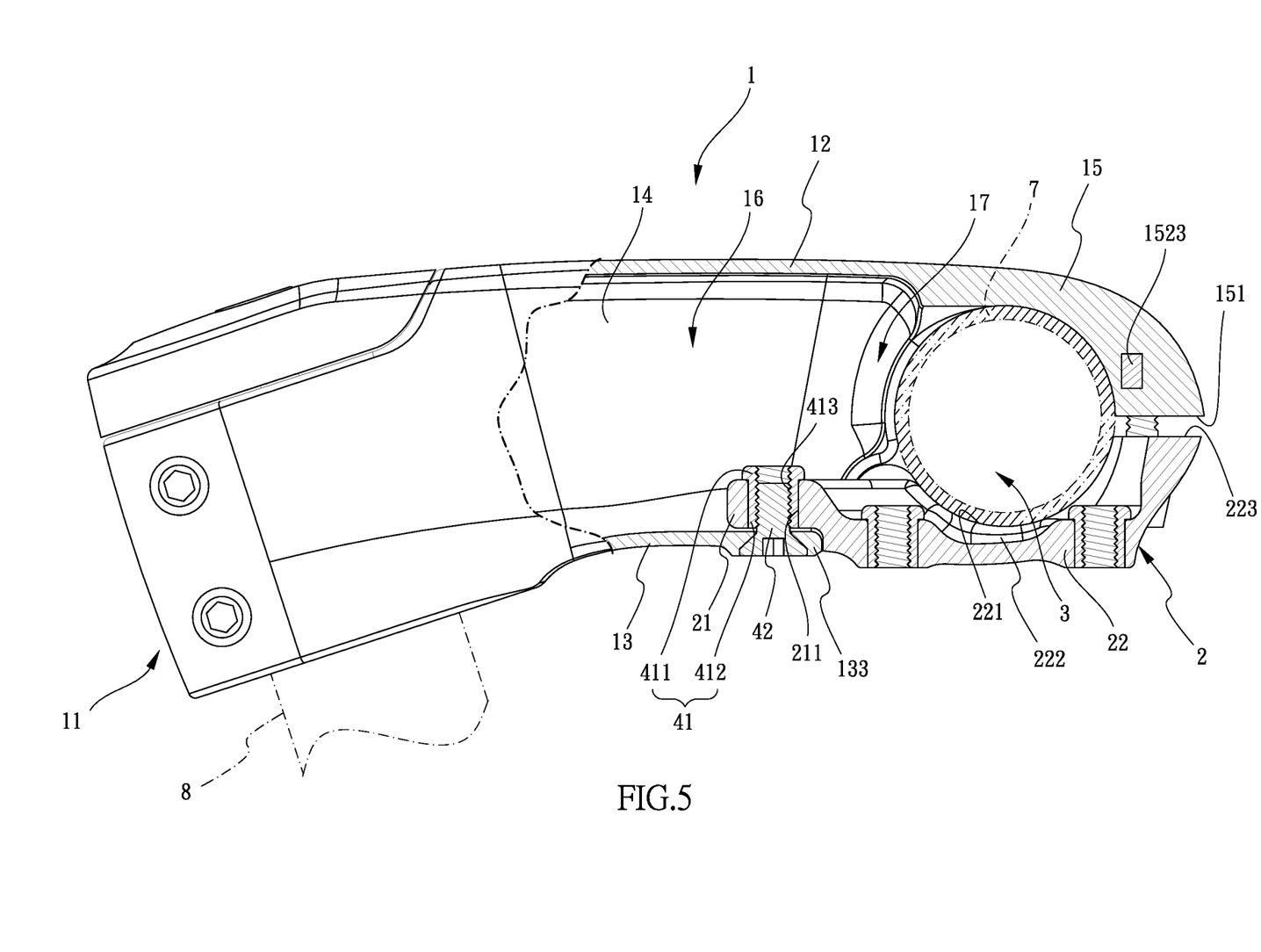
FIG. 5 is a cross sectional view, taken along line V-V of FIG. 4.

A connection member 4 extends through the body 1 and the tongue 21 of the bottom member 2 to connect the bottom member 2 to the body 1. Specifically, as shown in FIG. 5, the connection portion 4 includes a nut 41 and a bolt 42. The nut 41 includes a head 411, a shank 412 and a threaded hole 413 that extends through the head 411 and the shank 412. The tongue 21 of the bottom member 2 includes a bore 211 to which the shank of the nut 41 is connected. The head 411 contacts the tongue 21. The bolt 42 extends through the bottom part 13 and the bore 211, and is connected to the threaded hole 413. The tongue 21 is located between the head 411 and the bottom part 13. Preferably, as shown in FIG. 5, the bottom part 13 includes a thickened portion 133 located beside to the opening 17, and the bolt 42 of the connection member 4 extends through the thickened portion 133. Preferably, the bottom part 13 includes a groove 131 defined in the inside of the space 16. The groove 131 includes two first inclined walls that extend outward. The tongue 21 includes two second inclined walls which match with the first inclined walls 132.

Figure 6:
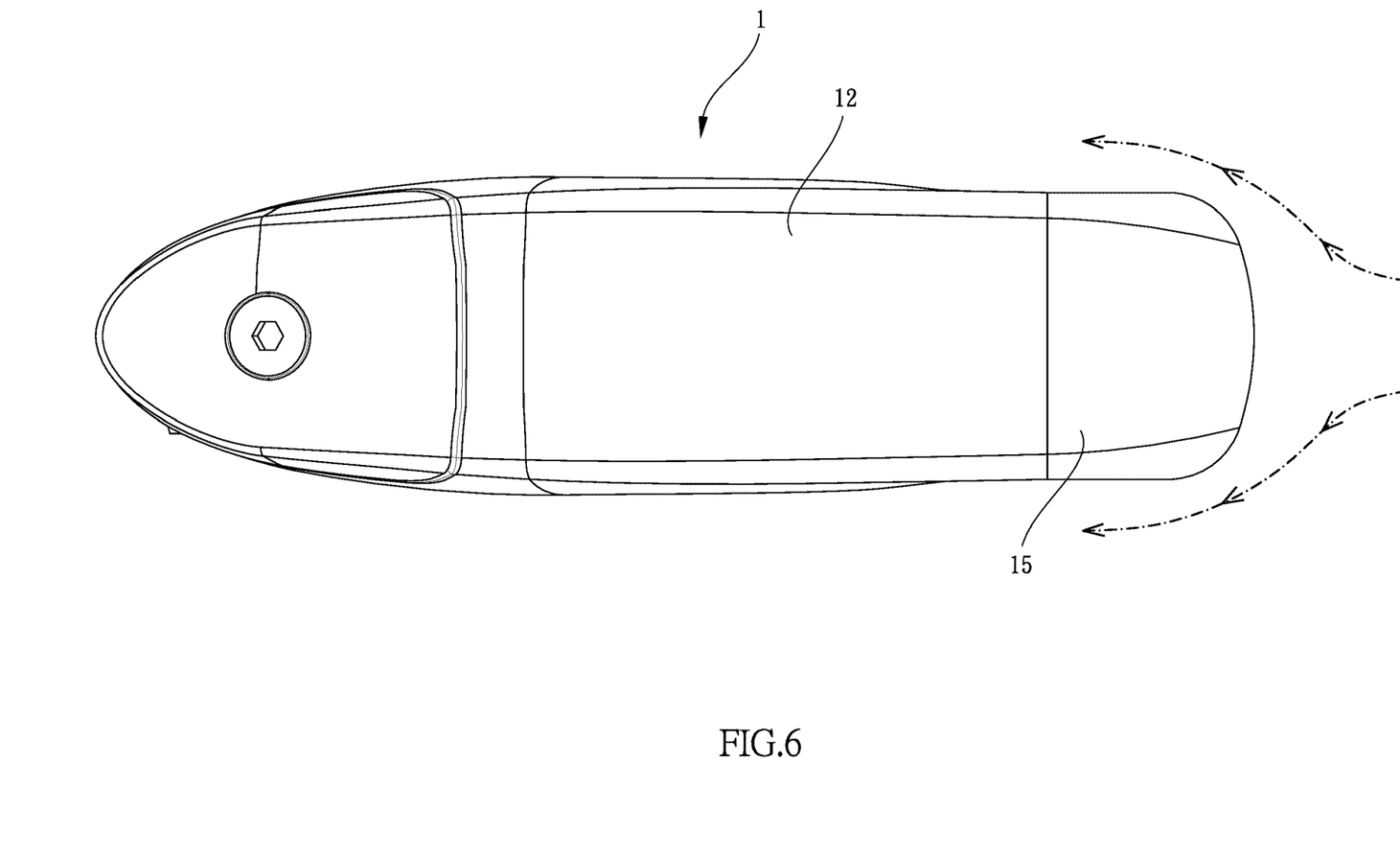
FIG. 6 is a top view of the handlebar stem of the present invention.
Figure 7:
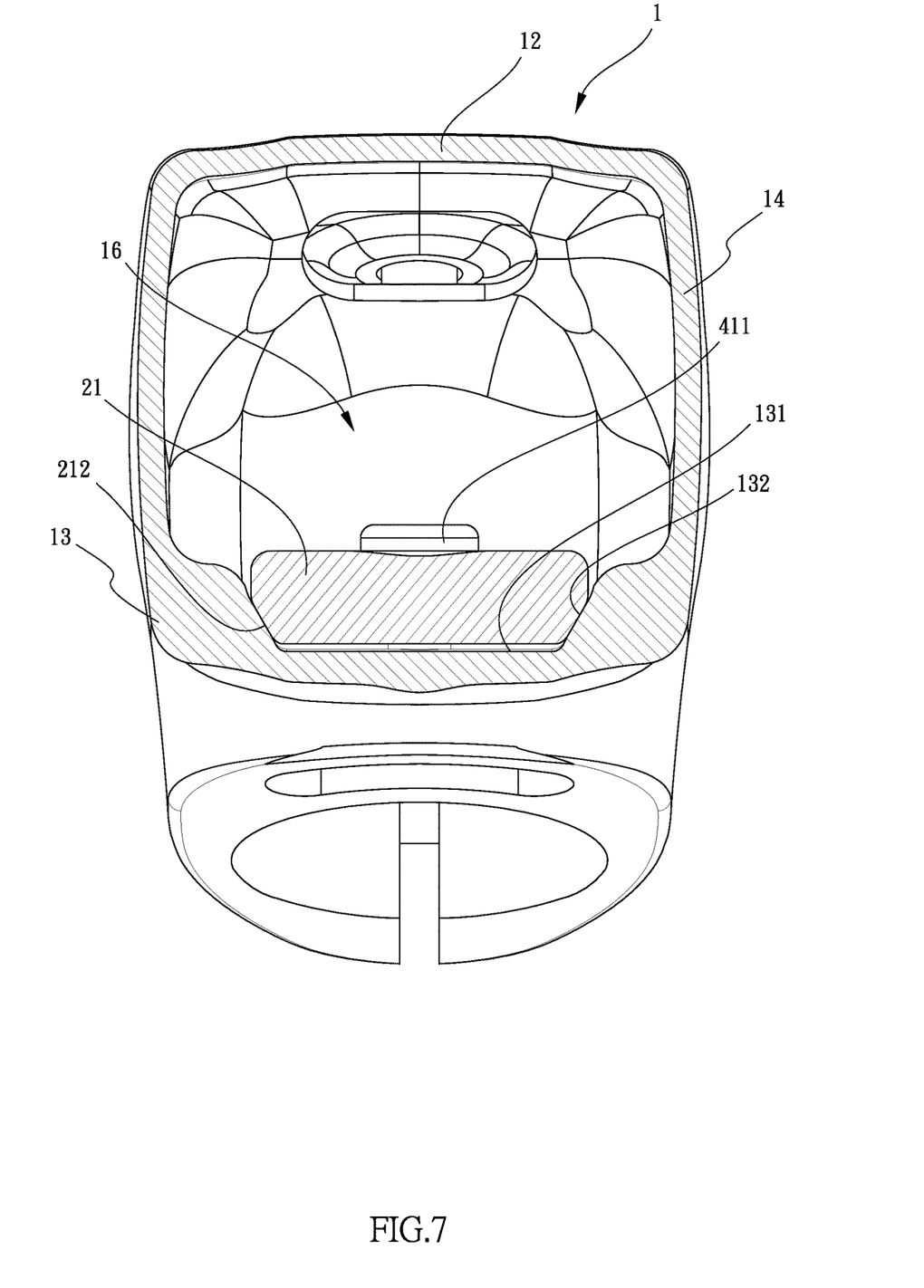
FIG. 7 is a cross sectional view, taken along line VII-VII of FIG. 1.
Figure 8:
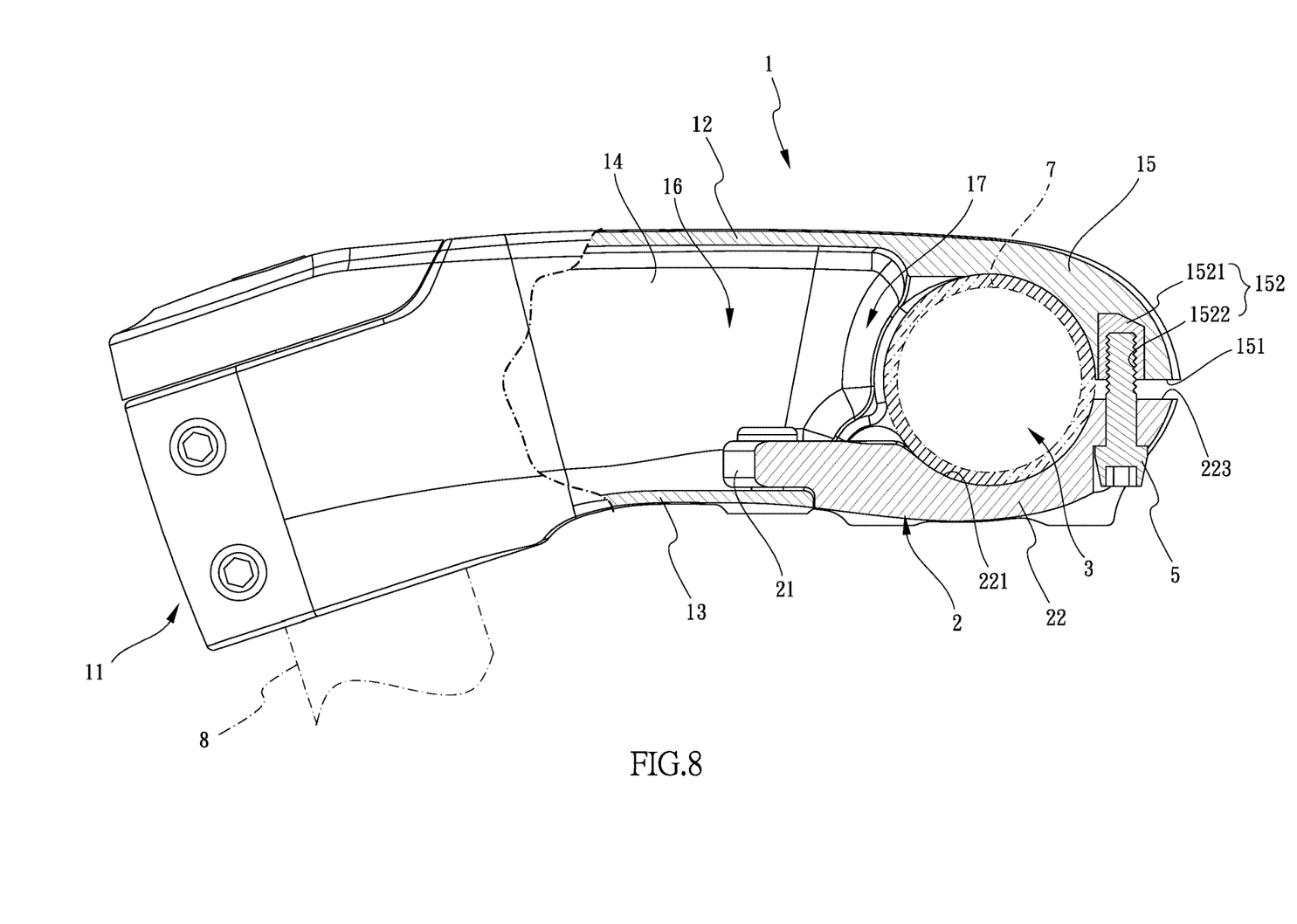
FIG. 8 is a cross sectional view, taken along line VIII-VII of FIG. 4.

Two fasteners 5, 6 extend from the underside of the bottom clamp and pass through two holes in the bottom clamp 22 so as to be connected to the top clamp 15. Specifically, the two fasteners 5, 6 extend through the bottom clamp 22 from the underside of the bottom clamp 22 and are connected to the two inner threaded holes 1522 of the two reception portions 1521. It is noted that the top surface of the top clamp 15 is curved and smooth so as to reduce wind resistance as shown in FIG. 6. The reception member 152 is made of high strength material to ensure that the fasteners 5, 6 are tightly secured. The distance between the first and second faces 151, 223 can be adjusted by rotating the two fasteners 5, 6. The number of the fasteners can be varied depending on different needs. By rotating the fasteners 5, 6, the gap is changed so as to accommodate the handlebars 7 of different sizes as shown in FIGS. 5 and 8.

The advantages of the present invention are that the direction that the fasteners 5, 6 connect the bottom clamp 2 and the top clamp 15 is different from the shaking directions (left and right) that the handlebar 7 fights against the vibration from the roads. The top clamp 15 is integral with the body 1 to reinforce the structural strength of the bicycle stem. The space in the body 1 further reduces the weight of the bicycle stem. When the bicycle handlebar 7 is connected between the top and bottom clamps 15, 22, the two curved faces 221 contact the handlebar 7 to further secure the handlebar 7. The two second inclined walls 212 of the tongue 21 match with the first inclined walls 132 of the groove 131 in the space 16 so that the tongue 21 does not move with locking the bolt 42.

While we have shown and described the embodiment in accordance with the present invention, it should be clear to those skilled in the art that further embodiments may be made without departing from the scope of the present invention.

What is claimed is:

1. A bicycle handlebar stem comprising:
   a body having a connection portion formed on a first end thereof, and a top clamp formed on a second end of the body, the top clamp having a downward portion extending downwardly, the body including a top part, a bottom part and two lateral parts, a space defined between the top part, the bottom part and the two lateral parts, an opening communicating with the space and outside of the body, the connection portion extending from respective first ends of the top part, the bottom part and the two lateral parts, the top clamp extending from a second end of the top part, the bottom part including a thickened portion located about the opening;
   a bottom member having a tongue extending from a first end thereof, and a bottom clamp formed on a second end of the bottom member, the bottom clamp having an upward portion extending upwardly and toward the downward portion of the top clamp, the opening located corresponding to the downward portion of the top clamp and the upward portion of the bottom clamp, the tongue inserted into the space via the opening, a passage defined between the top clamp, the bottom clamp and the body, the passage adapted to receive a handlebar;
   a connection member extending through the thickened portion of the bottom part of the body and the tongue of the bottom member to connect the bottom member to the body; at least one fastener extending through an underside of the bottom clamp and connected to the top clamp, and
   the downward portion of the top clamp including a first face that faces downward, the upward portion of the bottom clamp including a second face that faces the first face, a distance between the first and second faces being adjusted by rotating the at least one fastener, the top clamp including a reception member embedded therein, the reception member including two reception portions and a bridge which is formed between the two reception portions, each of the two reception portions including at least one inner threaded hole, the at least one fastener extending through the bottom clamp from the underside of the bottom clamp and connected to each of the at least one inner threaded hole.

2. The bicycle handlebar stem as claimed in claim 1, wherein the bottom clamp includes two curved faces formed on a top face that faces the passage, a recess is formed between the two curved faces, the two curved faces are adapted to contact the handlebar.

3. The bicycle handlebar stem as claimed in claim 1, wherein the bottom pail includes a groove defined in an inside of the space, the groove includes two first inclined walls that extend outward, the tongue includes two second inclined walls which match with the first inclined walls.

4. The bicycle handlebar stem as claimed in claim 1, wherein the connection portion includes a nut and a bolt, the nut includes a head, a shank and a threaded hole that extends through the head and the shank, the tongue of the bottom member includes a bore to which the shank of the nut is connected, the head contacts the tongue, the bolt extends through the bottom part and the bore, and is connected to the threaded hole, the tongue is located between the head and the bottom part.

* * * * *